United States Patent
Odaka

(10) Patent No.: US 7,763,699 B2
(45) Date of Patent: Jul. 27, 2010

(54) PROCESS FOR PRODUCTION OF ORGANIC POLYMER HAVING TRIMETHOXYSILYL TERMINUS

(75) Inventor: Hidetoshi Odaka, Hyogo (JP)

(73) Assignee: Kaneka Corporation, Osaka (JP)

( * ) Notice: Subject to any disclaimer, the term of this patent is extended or adjusted under 35 U.S.C. 154(b) by 214 days.

(21) Appl. No.: 12/059,936

(22) Filed: Mar. 31, 2008

(65) Prior Publication Data

US 2008/0227910 A1 Sep. 18, 2008

Related U.S. Application Data

(63) Continuation-in-part of application No. PCT/JP2006/319330, filed on Sep. 28, 2006.

(30) Foreign Application Priority Data

Sep. 30, 2005 (JP) ............................... 2005-288798

(51) Int. Cl.
C08G 65/46 (2006.01)
(52) U.S. Cl. .................... 528/29; 528/491; 528/494; 528/501; 528/25; 528/31
(58) Field of Classification Search .................... None
See application file for complete search history.

(56) References Cited

U.S. PATENT DOCUMENTS

| | | | | |
|---|---|---|---|---|
| 5,350,812 A | * | 9/1994 | Sultan et al. ................. | 525/477 |
| 5,633,311 A | | 5/1997 | Yamamoto et al. | |
| 7,307,134 B2 | * | 12/2007 | Lim et al. ..................... | 528/34 |
| 7,309,753 B2 | * | 12/2007 | Roesler et al. ................ | 528/29 |
| 2007/0173620 A1 | * | 7/2007 | Kono ........................... | 525/477 |
| 2009/0131585 A1 | * | 5/2009 | Prasse ......................... | 524/861 |

FOREIGN PATENT DOCUMENTS

| | | | |
|---|---|---|---|
| DE | 1545080 | * | 4/1962 |
| EP | 0693513 A2 | | 1/1996 |
| JP | 58-132022 A | | 8/1983 |
| JP | 60-188390 A | | 9/1985 |
| JP | 5-39428 A | | 2/1993 |
| JP | 7-165918 A | | 6/1995 |
| JP | 8-020646 A | | 1/1996 |
| JP | 9-124922 A | | 5/1997 |
| JP | 2000-034391 A | | 2/2000 |
| JP | 2001-2623 A | | 1/2001 |
| JP | 2005-213446 A | | 8/2005 |
| WO | WO 02-068501 A2 | | 9/2002 |
| WO | WO 2004/060952 | * | 7/2004 |
| WO | WO 2005/073322 | * | 8/2005 |

OTHER PUBLICATIONS

International Preliminary Report on Patentability dated Sep. 28, 2006, issued in corresponding with International Application No. PCT/JP2006/319330.
European Search Report dated Oct. 14, 2009, issued in corresponding European Patent Application No. 06810777.

* cited by examiner

Primary Examiner—Marc S Zimmer
(74) Attorney, Agent, or Firm—Westerman, Hattori, Daniels & Adrian, LLP

(57) ABSTRACT

The object of the present invention is to provide a method for producing an organic polymer having a terminal trimethoxy silyl group. In the method, the exchange reaction into a methoxy group can proceed within a short time even with a small amount of a catalyst, and viscosity increase caused by a side reaction during the methoxy exchange reaction can be reduced. Obtained polymer has an excellent stability, and viscosity increase during the storage of the polymer after the exchange into a trimethoxysilyl group can be reduced. The present invention provides a method comprising the steps of allowing an organic polymer having a silicon atom at a molecular terminus to react with methanol in the presence of a catalyst removable from an organic polymer and/or a deactivatable catalyst, wherein three hydrolyzable groups are bonded to the silicon atom, with the proviso that at least one of the three groups is a functional group other than methoxy group; and then removing the catalyst from the reaction mixture and/or deactivating the catalyst in the reaction mixture, to give the organic polymer having a terminal trimethoxysilyl group.

26 Claims, No Drawings

PROCESS FOR PRODUCTION OF ORGANIC POLYMER HAVING TRIMETHOXYSILYL TERMINUS

TECHNICAL FIELD

The present invention relates to a method for producing an organic polymer having a terminal trimethoxysilyl group.

BACKGROUND ART

Use of various kinds of organic polymers having a silicon-containing moiety with a hydroxyl group or hydrolyzable group that is directly linked to the silicon atom (hereinafter, the moiety is referred to as a hydrolyzable group-containing silicon moiety) for sealing compositions or adhesive compositions are well known. For example, organic polymers having a terminal methyldimethoxy moiety or organic polymers having a terminal trimethoxysilyl group are widely used as raw materials of moisture curable compositions.

An example of known methods for producing an organic polymer having a terminal hydrolyzable group-containing silicon moiety comprises allowing a polymer having a terminal ether-type unsaturated group to react with a hydrogenating silicon compound having a terminal hydrolyzable group-containing silicon moiety in the presence of a VIII group transition metal (See the below Patent Document 1). In this example, trimethoxysilane is used as a raw material for producing an organic polymer having terminal trimethoxysilyl group. However, trimethoxysilane is quite unstable. Thus, trimethoxylsilane may cause disproportionation, to generate monosilane, which has a low boiling point and spontaneous combustibility. The trimethoxysilane is so dangerous for human bodies, especially for eyes that handling of the trimethoxysilane is difficult, and furthermore, it is unobtainable.

The following several methods are also known in the art. A first method comprises allowing a silyl ether to react with a hydroxyl group-containing compound in the presence of a Lewis base catalyst (See the below Patent Document 2). A second method comprises allowing silyl ether to react with a hydroxyl group-containing compound in the presence of a tin or titanium catalyst (See the below Patent Document 3). A third method comprises allowing a hydroxyl group-containing polyether to react with a terminal isocyanato group-containing compound (See the below Patent Document 4). The organic polymers having a terminal methoxy silyl group obtained by these methods, however, disadvantageously show viscosity increase during storage.

Patent documents 1: JP-58-132022 A
Patent documents 2: JP-60-188390 A
Patent documents 3: WO 02/068501
Patent documents 4: JP-9-124922 A

SUMMARY OF THE INVENTION

The object of the present invention is to provide a method for producing an organic polymer having a terminal trimethoxy silyl group with excellent storage stability from an easily-available raw material.

The present inventor has made intensive studies, and as a result, found that the above subjects can be solved by allowing an organic polymer having a certain hydrolyzable group at a molecular terminus to react with methanol using a certain catalyst, to convert the organic polymer into one having a trimethoxysilyl group, and then removing and/or deactivating the catalyst. Based on this finding, the present inventor has completed the present invention. Namely, the constitution of the present invention is as follows:

Namely, the present invention is a method for producing an organic polymer having a terminal trimethoxysilyl group, which comprises the steps of allowing an organic polymer having a silicon atom at a molecular terminus to react with methanol in the presence of a catalyst removable from the organic polymer and/or a deactivatable catalyst, wherein three hydrolyzable groups are bonded to the silicon atom, with the proviso that at least one of the three groups is a functional group other than methoxy group; and then removing the catalyst from the reaction mixture and/or deactivating the catalyst in the reaction mixture, to give the organic polymer having a terminal trimethoxysilyl group.

In the method of the present invention, the exchange reaction into a methoxy group proceeds within a short time even with a small amount of a catalyst, and viscosity increase caused by a side reaction during the methoxy exchange reaction can be reduced. Obtained polymer has an excellent stability, and viscosity increase during the storage of the polymer after the exchange into a trimethoxysilyl group can be reduced.

BEST MODE FOR CARRYING OUT THE INVENTION

The present invention is a method for producing an organic polymer having a terminal trimethoxysilyl group. The method comprises allowing an organic polymer having a silicon atom at a molecular terminus to react with methanol in the presence of a catalyst removable from the organic polymer and/or a deactivatable catalyst, wherein three hydrolyzable groups are bonded to the silicon atom, with the proviso that at least one of the three groups is a functional group other than methoxy group; and then removing the catalyst from the reaction mixture and/or deactivating the catalyst in the reaction mixture.

The hydrolyzable group-containing silicon group, which exists at a molecular terminus of the organic polymer used in the present invention, has three hydrolyzable groups that are bonded to a silicon atom. The three hydrolyzable groups may be all the same or may be different from each other. It is needless to say, however, that organic polymers in which all the three hydrolyzable groups are methoxy groups are not used as raw materials, since the present invention is a method to convert a hydrolyzable group-containing silicon moiety into a trimethoxysilyl group. The three hydrolyzable groups bonded to a silicon atom include at least one hydrolyzable group other than methoxy group. Specific examples of the hydrolyzable group other than methoxy group include halogen, alkoxy, acyloxy, amido, acid amido, aminooxy, ketoxymato, amino, carbamoyl, mercapto and alkenyloxy. Among them, the number of carbon atoms in carbon atom-containing hydrolyzable groups is preferably not more than 10. Specifically, a lower alkoxy group or alkenyloxy group containing 4 or less carbon atoms is preferred. Among them, ethoxy, propoxy, butoxy and propenyloxy are preferred in view of storage stability and availability. Ethoxy is still more preferred.

The number of hydrolyzable group-containing silicon moiety termini in the organic polymer used in the present invention is not particularly restricted. The hydrolyzable group-containing silicon moiety may be present at either terminus or may be present at both termini of a linear organic polymer. Alternatively, at least one hydrolyzable group-containing silicon moiety may be at any of plural termini in a branched organic polymer.

The main chain of the organic polymer to be used in the present invention is not particularly restricted, and may be any known main chain skeleton. Examples of the main chain include polyester, polyether, polyolefin, polyurethane, polysiloxane, poly(meth)acrylate and polycarbonate, although the main chain is not limited to these examples. Preferred organic polymers include organic polymers essentially consisting of polyether, polyolefin, polyurethane, polysiloxane and poly(meth)acrylate from the view point that the obtained organic polymer having a terminal trimethoxysilyl group would show physical properties suitable for certain applications such as sealing materials or adhesives. Particularly preferred examples of the organic polymer include one having a main chain essentially consisting of polyether. Among them, polyesters having a polyoxypropylene and/or polyoxyethylene main chain are particularly preferred.

The ratio (Mw/Mn) between a weight average molecular weight (Mw) and a number average molecular weight (Mn) of the organic polymer having a silicon atom at a molecular terminus wherein three hydrolyzable groups are bonded to the silicon atom, with the proviso that at least one of the three groups is a functional group other than methoxy group is not particularly limited. However, the ratio (Mw/Mn) is preferably not more than 1.8 since viscosity increase caused by a side reaction during methoxy exchange reaction and/or during storage after exchange into trimethoxysilyl group is suppressed. The ratio (Mw/Mn) is more preferably not more than 1.5 and particularly preferably not more than 1.4.

The molecular weight of the organic polymer is not particularly limited, and the number average molecular weight (Mn) is preferably 5,000 to 50,000. If the Mn is not more than 5,000, an obtained organic polymer having a terminal trimethoxysilyl group may be brittle; thus, it is not preferred. If the Mn is not less than 50,000, the viscosity may become so high that the polymer would be difficult to be handled; thus, it is not preferred. The number average molecular weight is preferably 10,000 to 35,000 in view of viscosity of the organic polymer having a terminal trimethoxysilyl group obtained.

In the present invention, "Mw" or "Mn" means a value determined by gel permeation chromatography (GPC) based on polystyrene standards, using tetrahydrofuran as a solvent.

An organic compound having a main chain essentially consisting of polyether can be obtained by polymerizing alkylene oxide and the like to an initiator such as a hydroxy compound having at least one hydroxy group in the presence of various catalysts, such as cesium compounds, metalloporphyrin catalysts (See JP-61-197631 A), double metal cyanide complex catalysts (See U.S. Pat. Nos. 3,278,457, 3,278,458, 3,278,459, 3,427,256, 4,055,188, 4,721,818) and catalysts having a P=N bond (JP-11-106500 A, JP-10-36499 A, JP-11-302371 A). Among the catalysts, cesium compounds, double metal cyanide complex catalysts and catalysts having a P=N bond are preferred since a colorless oxyalkylene polymer having a higher-molecular weight can be obtained. Metal cyanide complex catalysts are particularly preferred. In such metal cyanide complex catalysts, a catalyst whose basic structure is $Zn_3[Co(CN)_6]_2$ (zinc hexacyanocobaltate complex), and to which alcohols such as tert-butyl alcohol and/or ethers such as ethylene glycol dimethyl ether (referred to as glyme, hereinafter) are coordinated, are preferred. In the case using a relatively-low-molecular-weight oxyalkylene polymer having a terminal hydroxy group, produced using a common alkaline catalyst such as potassium hydroxide, which is commonly used, use of multimer of oxyalkylene, obtained by extending a molecular chain through a reaction with a halide having two or more halogens, such as methylene chloride, is preferred.

Any known production method may be employed to produce the organic polymer used in the present invention, without any limitation. For example, triethoxysilyl-terminated polyether, which is one of preferred examples of the organic polymer used in the present invention, can be obtained by hydrosilylating a polyether having a terminal unsaturated group, such as allyl and/or methallyl, in the presence of a platinum catalyst and triethoxysilane.

The way to introduce an unsaturated group is not particularly restricted. Examples thereof include a method comprising allowing a compound having an unsaturated group and a functional group to react with an active hydrogen of an organic polymer, to be coupled by forming an ether bond, an ester bond, an urethane bond, a carbonate bond, etc.; or a method comprising adding unsaturated group-containing epoxy compounds such as allyl glycidyl ether during polymerization of alkylene oxide, to cause copolymerization for introducing an unsaturated group into a side chain.

Preferably, not less than 85% of the total number of molecular termini has unsaturated groups such as allyl or methallyl, to suppress the viscosity increase of the organic polymer having a terminal trimethoxysilyl group during storage. More preferably not less than 90%, still more preferably not less than 95% of the total number of molecular termini has unsaturated groups.

The content of water in the reaction mixture containing the organic polymer having a silicon atom at a molecular terminus wherein three hydrolyzable groups are bonded to the silicon atom, with the proviso that at least one of the three groups is a functional group other than methoxy group and methanol is preferably not more than 1,000 ppm, more preferably not more than 500 ppm, and still more preferably not more than 300 ppm. Water reacts with a hydrolyzable group to form a highly reactive silanol group. The silanol group may cause viscosity increase of an organic polymer during reaction or during storage. Thus, the less the content of water is, the better it is.

Methanol is a water-soluble organic solvent. Thus, methanol easily absorbs water, and water content in methanol easily increases. Thus, it is necessary that water content in methanol to be used in the present invention should be an amount such that the water content in a reaction mixture after addition of methanol does not exceed the above amount. The water content in methanol to be used in the present invention is preferably not more than 5,000 ppm, more preferably not more than 2,000 ppm, still more preferably not more than 1,000 ppm, and particularly preferably not more than 500 ppm. Sufficiently-dehydrated methanol may be used without dehydrating pretreatment before the reaction. On the other hand, methanol that contains water and/or a reaction mixture that contains water may be used after dehydration with various dehydrating agents. Alternatively, a dehydrating agent may be coexisted in the reaction mixture of an organic polymer with methanol.

Any compound having dehydratability may be used for dehydrating various raw materials and/or the reaction mixture. Examples of the compound include substances absorbing water molecules (such as activated alumina; zeolites including molecular sieves; and inorganic salts including magnesium sulfate); substances which shows dehydratability during azeotrope with water (such as hexane, toluene and xylene); and substances capable of causing chemical reaction with water (such as metals including metal sodium, organic metal compounds including organic lithium reactors, acid anhydrides, acid halides, polyphosphoric acid, phosphorus compounds including diphosphorus pentaoxide, ortho ester compounds including methyl orthoformate, acetal compounds, and hydrolyzable group-containing silicon compounds including methyl silicate). The compound is not limited to these, however.

Methanol may be used in any amount depending on the desired methoxy-exchanged ratio of an organic compound having trimethoxy silyl group. That is, if trimethoxy silyl-terminated organic compound with a high methoxy-exchanged ratio is desired, a large amount of methanol should be used. On the contrary, if trimethoxy silyl-terminated organic compound with a low methoxy-exchanged ratio is desired, an amount of methanol should be decreased. The amount of methanol is not particularly restricted, and is preferably 3 to 30 parts, more preferably 5 to 25 parts, still more preferably 10 to 20 parts, to 100 parts of an organic polymer, in view of viscosity during methoxy exchange reaction and/or time for recovering methanol after the methoxy exchange reaction and/or rate of methoxy exchange reaction. The amount of catalyst may be varied depending on the methanol amount for stabilizing the rate of methoxy exchange reaction and/or suppressing viscosity increase of the organic polymer having a trimethoxysilyl group during storage.

The catalyst to be used in the present invention is necessary to be removed from an organic polymer and/or to be deactivated. If a large amount of catalyst is remained in an organic polymer after methoxy exchange reaction, the viscosity tends to be high. Thus, it is necessary for the catalyst to be removed from an organic polymer and/or to be deactivated. The amount of catalyst remained in the organic polymer after methoxy exchange reaction is preferably not more than 10 ppm, more preferably not more than 5 ppm, still more preferably not more than 2 ppm, and particularly preferably not more than 1 ppm.

Generally known catalysts for converting a hydrolyzable group in hydrolyzable group-containing silicon moiety to another hydrolyzable group include acids, bases and metal alkoxides. Among them, acids, especially strong Brönsted acids, are preferred in the present invention, since a hydrolyzable group can be converted into methoxysilyl group within a short time even using small amount of the acids. Examples of such catalysts include hydrogen halides such as hydrogen chloride and hydrogen bromide; sulfuric acid; nitric acid; trifluoroacetic acid such as trifluoromethanesulfonic acid; and acids that are almost absolutely dissociated in an aqueous solution, such as perchloric acid. Catalysts removable from an organic polymer by devolatilization under reduced pressure are preferred since trace amount of catalyst remained in an organic polymer even after catalyst deactivation can be removed. The catalysts having a boiling point under atmospheric pressure of not higher than 150° C. is preferred. More preferred catalysts have a boiling point under atmospheric pressure of not higher than 100° C., and particularly preferred catalysts have a boiling point under atmospheric pressure of not higher than 70° C. In view of high activity and less side reactions, hydrogen halides such as hydrogen chloride and hydrogen bromide are preferred, and hydrogen chloride is particularly preferred.

The way to add the catalyst to be used in the present invention is not particularly restricted, and any known methods may be employed. Specifically, the catalyst may be added as liquid and/or solid catalysts, or may be added by blowing gaseous catalysts into a mixture, or by generating the catalyst in a reaction mixture, although it is not restricted thereto.

The catalyst may be added in the form of solution of the catalyst and/or a precursor of the catalyst in an organic solvent in order to lower the concentration of the catalyst since local viscosity increase of an organic polymer just after the addition of the catalyst is suppressed. If the catalyst is added without dilution by an organic solvent or the like, concentration of catalyst becomes locally high around a site where the catalyst is added. As a result, viscosity rapidly increases at the site, and gelation may occur. The concentration of the catalyst is not particularly restricted as long as it is such a concentration that local gelation is suppressed. The concentration of the catalyst is preferably not higher than 5 wt %, more preferably not higher than 2 wt %, still more preferably not higher than 1 wt %, and particularly preferably not higher than 0.5 wt %. Examples of the solvents include inactive organic solvents, which are inactive to a hydrolyzable group, such as toluene and hexane, and a raw material methanol, which is active to a hydrolyzable group to cause exchange reaction. If the catalyst and solvent used constitutes an azeotropic composition, it is desirable to use a solvent which has such an azotropic point that the solvent can be removed from an organic solvent by devolatilization under reduced pressure.

Specific examples of the methods for generating the catalyst in the reaction mixture include a method comprising allowing halosilanes to react with trace water in raw materials and/or an organic polymer when the organic polymer having a terminal hydrolyzable group-containing silicon moiety is allowed to react with methanol in the presence of a halosilane, and/or a method comprising generating hydrogen halide in a reaction mixture in the reaction of methanol with halosilanes. In the present invention, a "halosilane" and "halosilanes" are to be understood as compounds in which a halogen functional group bonds to a silicon atom. Halosilanes may be allowed to coexist with raw materials on producing an organic acid having a terminal hydrolyzable group-containing silicon moiety. For example, trichlorosilane, which is a raw material of triethoxysilane, or dichloroethoxysilane or monochlorodiethoxysilane, which are synthetic intermediates, may be allowed to be coexisted with raw materials when triethoxysilane is used as a hydrolyzable group-containing silicon compound. If halosilane is allowed to react with trace water in raw materials and/or an organic polymer, a halosilane functions as a dehydrating agent. Thus, halosilanes are preferred since they suppress viscosity increase during and/or after methoxy exchange reaction. Specific examples of halosilanes include chloroalkylsilanes, such as monochlorosilane, dichlorosilane and trichlorosilane which have various alkyl groups, although are not limited thereto. To suppress viscosity increase during reaction or during storage, monohalotrialkylsilanes, which have one hydrolyzable group, are preferred, and monochlorotrialkylsilane is particularly preferred.

The amount of the catalyst is preferably not higher than 0.05 part by weight, more preferably not higher than 0.03 part by weight, still more preferably not higher than 0.01 part by weight, and particularly preferably not higher than 0.005 part by weight, to 100 parts by weight of an organic polymer. If a large amount of catalyst is used, viscosity of an organic polymer may easily increase during the reaction, and, surprisingly, viscosity of an organic polymer may easily increase during storage even after removing the catalyst from an organic polymer and/or deactivating the catalyst. Therefore, it is preferred that the used amount of the catalyst or the amount to be generated of the catalyst is small.

Specific examples of methods for removing the catalyst from an organic polymer include devolatilization under reduced pressure, or deactivating the fumed catalyst, which is volatilized into gas phase by heating, in the gas phase, although they are not limited thereto.

Specific examples for deactivating the catalyst include a reaction with an epoxy compound and a reaction with a basic compound, although they are not limited thereto. If the step of producing an organic polymer having a silicon atom, to which three hydrolyzable groups are bonded, with the proviso that at least one of the three groups is a functional group other than methoxy group, and the step of allowing the organic polymer to react with methanol are both conducted in the same reaction vessel, the catalyst may be deactivated by a reaction with an epoxy compound rather than by a reaction with a basic deactivating agent from the viewpoint that a group VIII transition metal catalyst, which is to be used in the production of the organic polymer having a terminal hydrolyzable group-containing silicon moiety, should not be deactivated.

Specific examples of the epoxy compound include aliphatic epoxy compounds such as propylene oxide, ethylene oxide, 2,3-butylene oxide, and isobutylene oxide; glycidyl ethers such as methyl glycidyl ether, allyl glycidyl ether, butyl glycidyl ether, phenyl glycidyl ether, 2-ethylhexyl glycidyl ether and polypropylene glycol diglycidyl ether; $C_{4-30}$ epoxydized α-olefins such as by Vicolox 10, Vicolox 12, Vicolox 14, Vicolox 16, and Vicolox 18 (manufactured by Arkema); terpene oxides such as α-pinene oxide, limonene monoxide, and a limonene dioxide; epoxidized vegetable oils such as epoxidized soybean oil and epoxidized linseed oil; epoxidized aliphatic esters represented by SANSOCIZER E-6000 and SANSOCIZER E-4030 (all manufactured by New Japan Chemical Co., Ltd.); and alicyclic epoxy compounds represented by SANSOCIZER E-PS, SANSOCIZER E-PO and SANSOCIZER nE-PS (manufactured by New Japan Chemical Co., Ltd.). These may be used alone or in combination of two or more of them. Among these, epoxy compounds that are synthesized through oxidation reaction, such as epoxydized α-olefins, epoxydized vegetable oils, epoxidized aliphatic esters and alicyclic epoxy compounds are preferred to suppress viscosity increase during storage. Epoxydized vegetable oils are particularly preferred in view of toxicity of epoxy compounds.

It seems desirable to use excess amount of epoxy compound, which is to be used for deactivation, to the amount of the catalyst for effectively deactivating the catalyst. Furthermore, it may be expected that effective deactivation of the catalyst suppress the viscosity increase of the organic polymer having a trimethoxysilyl group during storage. However, it had been surprisingly found in the present invention that use of too much amount of an epoxy compound, which is to be used for deactivation, often leads to viscosity increase of the organic polymer having a trimethoxysilyl group during storage. Therefore, the amount of the epoxy compound, which is to be used for deactivation, is preferably an amount such that oxylane oxide in the epoxy compound should be not more than 100 mol equivalents, more preferably an amount such that oxylane oxide in the epoxy compound should be not more than 50 mol equivalents, still more preferably an amount such that oxylane oxide in the epoxy compound should be not more than 25 mol equivalents, and particularly preferably an amount such that oxylane oxide in the epoxy compound should be not more than 10 mol equivalents, to the amount of the catalyst.

In the present invention, it is preferred to control the residual amount of the catalyst by measuring pH value of the organic polymer having a trimethoxysilyl group, which is obtained after removal of the catalyst and/or after deactivation of the catalyst, in order to suppress the viscosity increase during storage. The pH value of the organic polymer having a trimethoxysilyl group used herein may be determined according to JIS K 1557 standard. It is preferred that the catalyst should be removed and/or deactivated such that pH determined according to the JIS K 1557 standard should be within 6 to 8.

As the catalyst, acids may be used in the present invention. However, acids may corrode a reaction vessel. It has been found that, if a reaction vessel is corroded, metal impurities, which are generated by corrosion, may contaminate an organic polymer, and cause viscosity increase of the organic polymer during storage. If the reaction is conducted in a reaction vessel made of a stainless steel such as SUS 316, which is used in general commercial applications, corrosion of the reactor sometimes develops depending on conditions, such as type and/or concentration of the catalyst, or temperature and/or time or reaction. As a result of the corrosion, iron element, which is the main element of stainless steel, is eluted, and it contaminates the organic polymer having a terminal trimethoxysilyl group as an impurity. Then, it is assumed that iron compounds contained as metal impurities function as curing catalysts, and cause viscosity increase during storage. For this reason, the level of iron element contained in the organic polymer having a terminal trimethoxysilyl group is preferably not higher than 6 ppm, more preferably not higher than 3 ppm, still more preferably not higher than 1 ppm, and particularly preferably not higher than 0.1 ppm.

Thus, when the organic polymer having a trimethoxysilyl group is produced in a condition such that corrosion of the reaction vessel may occur, it is preferred in the present invention to produce the organic polymer having a trimethoxysilyl group in a reaction vessel the inner side of which is made of a corrosion-resistant material. Preferred examples of the corrosion-resistant material include pure metals corrosion-resistant to acids, such as nickel, titanium, molybdenum, chromium and a tantalum, and various alloys containing these metallic elements. Among these, nickel-chromium-molybdenum alloys, such as Hastelloy C276, or nickel-molybdenum alloys, such as Hastelloy B, are preferred in view of corrosion resistance, durability and heat conductivity. It is also possible to line the inside of a reaction vessel with corrosion-resistant materials, such as glass or a fluororesin, to make the inside of the reactor resistant to corrosion. This lining is especially advantageous in cost. It is also possible to use a combination of these materials.

In the present invention, the step for producing an organic polymer having a silicon atom, to which three hydrolyzable groups are bonded, with the proviso that at least one of the three groups is a functional group other than methoxy group, at a molecular terminus and the step for allowing the organic polymer to react with methanol may be conducted each in different reaction vessels, or may be conducted both in the same reaction vessel. In view of facility cost, both steps may be conducted in the same reaction vessel.

The reaction of the organic polymer having a silicon atom, to which three hydrolyzable groups are bonded, with the proviso that at least one of the three groups is a functional group other than methoxy group, at a molecular terminus and methanol can be monitored, for example, from disappeared ratio of the peak for the ethoxysilyl group using $^1$H-NMR, in the case of a reaction of an organic polymer having a terminal triethoxysily group. It is also possible to determine an exchanged ratio to a methoxy group by assaying hydrolyzable groups other than methoxy groups as alcohols by gas chromatograph (GC) analysis of alcoholic solution of the organic polymer after a reaction. The exchanged ratio of the organic polymer of the present invention, having a terminal trimethoxysilyl group is not necessary 100%, and preferably not lower than 50%, more preferably not lower than 75%, and particularly preferably not lower than 85%. For uses, in which improvement in the cure rate of an organic polymer is demanded, the exchanged ratio is preferably not lower than 90%, and particularly preferably not lower than 95%.

The organic polymer having a terminal trimethoxysilyl group obtained in the present invention is particularly useful as a raw material of elastic sealants, adhesives, or the like, and compositions containing the organic polymer with curable agents or various fillers can be used as sealing agents or adhesives for buildings, ships, cars, roads, and the like. The composition can be used as a raw material for adhesive, such as contact adhesives, as well as ordinary adhesives. It is useful also as raw materials of food packaging materials, casting rubber materials, molding materials, paintings, and the like.

EXAMPLES

The present invention will be explained in more detail by illustrating Examples. These examples are, however, not intended to limit the scope of the invention only to these examples.

In the following, "a part" and "parts" means "a part by weight" and "parts by weight", respectively. Mn and Mw/Mn were determined as mentioned above. That is, they were determined based on polystyrene standard by GPC using tetrahydrofuran as a solvent. The ratios of unsaturated groups existing at molecular termini were calculated as follows. First, Terminal structures were assumed to be a hydroxyl group and an unsaturated group. Second, the amounts of the hydroxy groups were determined based on JIS K 1557 standard. Third, the amount of unsaturated groups was determined based on JIS K 0070 standard. Based on the obtained values, the ratio of unsaturated groups existing at molecular termini was calculated. Exchanged ratios to methoxy groups were determined based on disappeared ratio of ethoxysilyl groups using $^1$H-NMR. Amounts of water were measured using a Karl Fischer aquameter. The values of pH were measured according to JIGS K 1557 standard. Specifically, 10 g of an organic polymer, or a methanol solution of an organic polymer in such an amount as equivalent to 10 g of the organic polymer was weighed. The organic polymer or the solution was dissolved in 50 ml of an isopropanol/water 100:30 (vol/vol) mixed solvent. Then, the pH value of the obtained solution was measured. Viscosities were measured at 23° C. using an E-type viscometer. The viscosity ratio of the organic polymer between before and after methoxy exchange was determined as a ratio of viscosity increase after deactivation for evaluation. The viscosity increase after storage was determined from a difference of viscosity between before and after storage of the organic polymer having a terminal trimethoxysilyl group for one week at 80° C., for evaluation.

Example 1

A polyoxypropylene diol was obtained from a polyoxypropylene diol with Mn of 3,000 as an initiator using a zinc hexacyanocobaltate complex catalyst. The obtained polyoxypropylene diol was allowed to react with allyl chloride in the presence of an alkaline catalyst, to convert the terminal hydroxy group into an allyloxy group. After purification, polyoxypropyrene having a terminal allyl group with an allyl-converted ratio of 86% was obtained. Trimethoxysilane was further reacted with the obtained polyoxypropylene in the presence of divinyltetramethylsiloxane-platinum complex catalyst, to give organic polymer A with Mn of 27,000 and Mw/Mn of 1.26, having average 1.2 terminal triethoxysilyl-propyl groups per molecule.

Example 2

Polyoxypropyrene having a terminal allyl group with an allyl-converted ratio of 96% was obtained by the same process as that in Example 1. Then, organic polymer B with Mn of 11,000 and Mw/Mn of 1.16, having average 1.4 terminal triethoxysilyl propyl groups per molecule was synthesized by the same process as that of Example 1.

Example 3

Polyoxypropyrene having a terminal allyl group with an allyl-converted ratio of 98% was obtained by the same process as that in Example 1, except that polyoxypropylene triol with Mn of 3,700 was used as an initiator. Organic polymer C with Mn of 26,000 and Mw/Mn of 1.28, having average 2.2 terminal triethoxysilyl propyl groups per molecule was synthesized by the same process as that in Example 1.

Example 4

A glass reaction vessel equipped with a reflux condenser was charged with 100 parts by weight of organic polymer A and 20 parts of hexane. The mixture was dehydrated in an azeotropic condition at 90° C. for 1 hour. Then, 20 parts of methanol (water content: 38 ppm) and 0.050 part (net amount of HCl: 0.0025 part) of 5-wt % HCl-methanol solution (Tokyo Chemical Industry co., Ltd.) to 100 parts of the organic polymer were added in the vessel, and the reaction was allowed to proceed for 30 minutes in a 90° C. oil bath. In this way, a pH 4.5-methanol solution of organic polymer A1 having a methoxy-exchanged ratio of 96% was obtained.

Example 5

The same reaction as that in Example 4 was conducted except that 0.0070 part of sulfuric acid to 100 parts of the organic polymer was used as a catalyst, to give a methanol solution of organic polymer A2 having a methoxy-exchanged ratio of 96%.

Example 6

After obtaining the pH-4.5 methanol solution of organic polymer A1, the solution was devolatilized under reduced pressure at 90° C. for 1 hour, to give organic polymer A1 with pH of 7.2.

Example 7

After obtaining the pH-4.5 methanol solution of organic polymer A1, 1 part of bis(2-ethylhexyl) 4,5-epoxyhexahydrophthalate (SANSOCIZER E-PS, New Japan Chemical Co., Ltd.) was added to the solution, to give a pH 6.4-methanol solution of organic polymer A3. Then, the solution was devolatilized under reduced pressure at 90° C. for 1 hour, to organic polymer A3, with pH value of 7.0.

Example 8

A pressure-resistant glass reaction vessel was charged with 100 parts by weight of organic polymer C and 2 parts of hexane. The mixture was dehydrated in an azeotropic condition at 90° C. for 1 hour. Then, 20 parts of methanol (water content: 200 ppm), and 0.060 part (net amount of HCl: 0.0012 part) of 2-wt % HCl-methanol solution, which had been prepared by diluting 36-wt % aqueous HCl with methanol, to 100 parts of the organic polymer were added to organic polymer C at 90° C. The reaction of the mixture was allowed to proceed for 1 hour with controlling inner temperature to be 70° C., to give a pH 5.3-methanol solution of organic polymer C1. Then, 0.058 part (corresponding to 7.4 mol of oxyrane oxygen to HCl) of epoxidized soybean oil (SANSOCIZER E-2000H, New Japan Chemical Co., Ltd.) to 100 parts of the organic polymer was added to the solution, and then the solution was stirred for 1 hour for deactivating the catalyst, to give a pH-7.0 methanol solution of organic polymer C1. The methanol solution was devolatilized under reduced pressure at 90° C. for 1 hour, to give organic polymer C1, having pH value of 7.1 and methoxy-exchanged ratio of 95%.

Examples 9 to 13

The same reaction as that in Example 8 was conducted except that a different kind of methanol, prepared by deliberately adding water to the methanol, was used. Organic polymers C2 to C6 were produced in this way.

Example 14

The same reaction as that in Example 8 was conducted except that methanol with water content of 600 ppm was used, and 0.21 parts of methyl orthoformate was added before the addition of 2-wt % HCl-methanol solution in the organic polymer. Organic polymer C7 was produced in this way.

Examples 15 to 17

A glass reaction vessel equipped with a reflux condenser was charged with 100 parts of organic polymer C and 2 parts of hexane. The mixture was dehydrated in an azeotropic condition at 90° C. for 1 hour. Then, 20 parts of methanol (water content: 200 ppm) and an appropriate amount of 5-wt % HCl-methanol solution (Tokyo Chemical Industry co., Ltd.) were added in the vessel, and the reaction was allowed to proceed for 30 minutes in a 90° C. oil bath. The obtained mixture was devolatilized under reduced pressure at 90° C. for 1 hour, to give organic polymers C8 to C10 having methoxy-exchanged ratios of 95%.

Example 18

The same reaction as that in Example 4 and Example 7 was conducted except that 0.024 part (net amount of HCL: 0.0012 part) of 5-wt % HCl-methanol solution (Tokyo Chemical Industry co., Ltd.) to 100 parts of the organic polymer and 0.76 part (corresponding to 97 mol of oxyrane oxygen to HCl) of epoxidized soybean oil to 100 parts of the organic polymer was used as an epoxy compound. Organic polymer A4 was produced in this way.

Examples 19 to 22

A pressure-resistant glass reaction vessel was charged with 100 parts by weight of organic polymer C and 2 parts of hexane. The mixture was dehydrated in an azeotropic condition at 90° C. for 1 hour. Then, 20 parts of methanol (water content: 200 ppm) to 100 parts of the organic polymer and 0.050 part (net amount of HCl: 0.0025 part) of 5-wt % HCl-methanol solution (Tokyo Chemical Industry co., Ltd.) were added. The mixture was allowed to proceed the reaction for 1 hour with controlling inner temperature to be 70° C., to give a pH 6.8-methanol solution of organic polymer C11 having a methoxy exchanged ratio of 95%. An appropriate amount of 5-wt % HCl-methanol solution (Tokyo Chemical Industry co., Ltd.) was added to organic polymer C11, to give organic polymers C12 to C14, in which the catalyst was remained.

Example 23

The same reaction as that in Example 4 was conducted except that organic polymer B was used. After devolatilization at 90° C. for 1 hour, organic polymer B1, which had a pH value of 7.2, and methoxy-exchanged ratio of 92%, was recovered.

Example 24

The same reaction as that in Example 23 was conducted except the test piece of MA276 (MITSUBISHI MATERIALS CORP.), which is a nickel chromium molybdenum alloy, was immersed. After devolatilization at 90° C. for 1 hour, organic polymer B2, which had a pH value of 7.2, was recovered.

Comparative Examples 1 and 2

The same reaction as that in Example 4 was conducted except that each 0.10 part of titanium acetylacetonate (Orgatics TC100, Matsumoto Chemical Industry Co., Ltd.) to 100 parts of the organic polymer and titanium tetraisopropoxide to 100 parts of the organic polymer, which are titanium Lewis acids, were used as catalysts, and reaction time was extended. Methanol solutions of organic polymers A5 and A6 were obtained in this way.

Comparative Example 3

Sodium carbonate was added to the to the pH 4.5 methanol solution of organic polymer A1 of Example 4. The solution was heated at 90° C. for 1 hour to deactivate the catalyst. Then, the solution was devolatilized under reduced pressure at 90° C. for 1 hour, to give organic polymer A7 having pH of 8.8.

Comparative Example 4

The same reaction as that in Example 8 was conducted except methanol containing 7,500 ppm of water, which had been prepared by deliberately adding water to the methanol, was used. Organic polymer C15 was produced in this way.

Comparative Example 5

The same reaction as that in Example 15 was conducted except that 1.1 wt % of 5-wt % HCl-methanol solution (net amount of HCl: 0.055 part) to 100 parts of the organic polymer was added, to produce organic polymer C16.

Comparative Example 6

The same reaction as that in Example 7 was conducted except that 5 parts of SANSOCIZER E-PS was added to the organic polymer, to produce organic polymer A8.

Comparative Example 7

The same reaction as that in Example 19 was conducted except that 0.021 part of 5-wt % HCl-methanol solution (net amount of HCl: 0.00105 part) to 100 parts of the organic polymer was added to organic polymer C11, to produce organic polymer C17.

Comparative Example 8

The same reaction as that in Example 23 was conducted except the test piece of SUS 316L (Nippon Metal Industry Co., Ltd.), which is a stainless steel, was immersed. After devolatilization at 90° C. for 1 hour, organic polymer B3, which had a pH value of 4.7, was recovered.

The results of Examples 4 and 5 and Comparative examples 1 and 2 are illustrated in Table 1. In the Examples 4 and 5 using the strong acid of Brönsted acid as a catalyst, catalytic activity was high and most ethoxysilyl groups were reacted within a short time. On the contrary, in Comparative examples 1 and 2, catalytic activity was low, and even if reaction was conducted for a long time using a lot of catalysts, conversion was not so proceeded.

TABLE 1

|  | Example 4 | Example 5 | Comparative Example 1 | Comparative Example 2 |
| --- | --- | --- | --- | --- |
| Organic Polymer | A1 | A2 | A5 | A6 |
| Catalyst | HCl | Sulfuric acid | TC100 | Ti(OiPr)$_4$ |
| Catalyst amount (part) | 0.0025 | 0.0070 | 0.10 | 0.10 |
| Reaction time (hr) | 0.5 | 0.5 | 1 | 2 |
| The ethoxysilyl-disappeared ratio (%) | 96 | 96 | 25 | 37 |

The results of Examples 6 to 8 and Comparative example 3 are illustrated in Table 2. The method to remove or deactivate the catalyst in Examples 6 to 8, pH of each of the organic polymers was within 6 to 8, and viscosity increase after deactivation and after storage were little. On the contrary, pH value exceeded 8 in Comparative example 3, and significant viscosity increase was observed after storage.

TABLE 2

|  | Example 6 | Example 7 | Example 8 | Comparative Example 3 |
| --- | --- | --- | --- | --- |
| Organic Polymer | A1 | A3 | C1 | A7 |
| Way to remove or deactivate the catalyst | Devolatilization under reduced pressure | E-PS | Epoxydized soybean oil | Na$_2$CO$_3$ |
| Deactivator/catalyst (eq) | — | 31.8 | 7.4 | 1.2 |
| pH after removal or deactivation of catalyst | 7.2 | 7.0 | 7.1 | 8.8 |
| Viscosity increase after deactivation (times) | 1.00 | 1.00 | 1.00 | 1.00 |
| Viscosity increase after storage (times) | 1.01 | 1.06 | 1.02 | 1.74 |

The results of Examples 8 to 14 and Comparative example 4 are illustrated in Tables 3 and 4. As increase of water content in methanol and/or water content in reaction mixture during reaction, viscosity increase after deactivation and/or after storage was getting worse. In Example 14, use of dehydrating agent lowered the water content during reaction.

TABLE 3

|  | Example 8 | Example 9 | Example 10 | Example 11 |
| --- | --- | --- | --- | --- |
| Organic Polymer | C1 | C2 | C3 | C4 |
| Water content in methanol (ppm) | 200 | 800 | 1,300 | 1,800 |
| Water content in the reaction mixture (ppm) | 103 | 235 | 303 | 419 |
| Viscosity increase after deactivation (times) | 1.00 | 1.00 | 1.01 | 1.05 |
| Viscosity increase after storage (times) | 1.02 | 1.03 | 1.08 | 1.06 |

TABLE 4

|  | Example 12 | Example 13 | Example 14 | Comparative Example 4 |
| --- | --- | --- | --- | --- |
| Organic Polymer | C5 | C6 | C7 | C15 |
| Water content in methanol (ppm) | 3,000 | 4,500 | 600 | 7,500 |
| Water content in the reaction mixture (ppm) | 719 | 956 | 42 | 1574 |
| Viscosity increase after deactivation (times) | 1.09 | 1.11 | 1.00 | 1.23 |
| Viscosity increase after storage (times) | 1.26 | 1.49 | 1.01 | 2.46 |

The results of Examples 15 to 17 and Comparative example 5 are illustrated in Table 5. Viscosity increase was observed after catalyst deactivation by increasing the amount of catalysts. Surprisingly, viscosity increase was observed even after storage by increasing the amount of catalysts after removal and/or deactivation of catalyst.

TABLE 5

|  | Example 15 | Example 16 | Example 17 | Comparative Example 5 |
| --- | --- | --- | --- | --- |
| Organic Polymer | C8 | C9 | C10 | C16 |
| 5 wt % HCl-methanol solution (part) | 0.024 | 0.050 | 0.20 | 1.1 |
| Net amount of HCl in the above solution (part) | 0.0012 | 0.0025 | 0.010 | 0.055 |
| Viscosity increase after deactivation (times) | 1.00 | 1.00 | 1.06 | 1.73 |
| Viscosity increase after storage (times) | 1.01 | 1.01 | 1.12 | 2.98 |

The results of Examples 7, 8 and 18 and Comparative example 6 are illustrated in Table 6. It can be considered that increase of amount of epoxy compound to be used for catalyst deactivation was effective since the catalyst was efficiently deactivated and viscosity increase after storage can be suppressed. It was surprising that viscosity increase after storage was larger by increasing the amount of the epoxy compound used.

TABLE 6

|  | Example 7 | Example 8 | Example 18 | Comparative Example 6 |
|---|---|---|---|---|
| Organic Polymer | A3 | C1 | A4 | A8 |
| Amount of catalyst | 25 | 12 | 12 | 25 |
| Epoxy compound | E-PS | Epoxydized soybean oil | Epoxydized soybean oil | E-PS |
| Amount of epoxy compound (part) | 1.0 | 0.058 | 0.76 | 5.0 |
| Oxirane oxide/ Catalyst (eq) | 31.8 | 7.4 | 97 | 159 |
| Viscosity increase after deactivation (times) | 1.00 | 1.00 | 1.00 | 0.92 |
| Viscosity increase after storage (times) | 1.06 | 1.02 | 1.19 | 1.56 |

The result of Examples 19 to 22 and Comparative example 7 are illustrated in Table 7. Hydrogen chloride, which was a catalyst, was added as a methanol solution to C11 of Example 19, from which the catalyst had been removed. A sample, in which catalyst was remained in an organic polymer having a terminal trimethoxysiliy group, was prepared from the obtained mixture. As added amount (remained amount) was increased, viscosity increase after deactivation and/or storage was larger. In Comparative example 7, in which 0.00105 part of hydrogen chloride had been added, pH of the organic polymer having a terminal trimethoxysiliy group became 5.5, and viscosity increase was also larger.

TABLE 7

|  | Example 19 | Example 20 | Example 21 | Example 22 | Comparative Example 7 |
|---|---|---|---|---|---|
| Organic Polymer | C11 | C12 | C13 | C14 | C17 |
| 5 wt % HCl-methanol solution (part) | — | 0.0010 | 0.0020 | 0.010 | 0.021 |
| Net amount of HCl in the above solution (part) | — | 0.000050 | 0.00010 | 0.00050 | 0.00105 |
| pH after addition of HCl | 6.8 | 6.8 | 6.7 | 6.1 | 5.5 |
| Viscosity increase after deactivation (times) | 1.00 | 1.00 | 1.01 | 1.03 | 1.05 |
| Viscosity increase after storage (times) | 1.02 | 1.06 | 1.12 | 1.39 | 1.56 |

The results of Examples 23 and 24 and comparative example 8 are illustrated in Table 8. In Example 23, a reaction vessel with glass lining was used for the reaction. Thus, the inner side of the vessel was made of a corrosion-resistant material. In Example 24, a MA 276 test piece was immersed in the reaction mixture, and used for the reaction in the reaction vessel made of MA 276 (Hastelloy C276), which is a corrosion-resistant material. In Comparative Example 8, a SUS 316L test piece was immersed in the reaction mixture, and used for the reaction in the reaction vessel made of SUS 316L, which is a stainless steel. In Examples 23 and 24, Fe and Ni, which can elute by corrosion, were not contained, and viscosity during storage was less increased. On the other hand, in comparative example 8, Fe and Ni, which can be ingredients to be corroded, was eluted, and the pH value was lowered to 4.7. Furthermore, since metal ingredients eluted by corrosion functioned as a condensation catalyst of hydrolyzable group-containing silicon moiety, viscosity was increased during storage.

(Analysis of Metals)

Organic polymers B1 to B3 were each placed in a platinum crucible. Then, the polymers were heated by a burner to be carbonized, and then heated by an electric furnace to be carbonized. Carbonized matters were decomposed by sulfuric acid, nitric acid, and hydrofluoric acid with heating, then dissolved with diluted nitric acid and made them be a certain volume. The obtained solution was analyzed by ICP emission spectrochemical analysis for determining the content in a sample.

TABLE 8

|  | Example 23 | Example 24 | Comparative Example 8 |
|---|---|---|---|
| Organic Polymer | B1 | B2 | B3 |
| Test piece | None | MA 276 | SUS 316L |
| Way to remove or deactivate the catalyst | Devolatilization under reduced pressure | Devolatilization under reduced pressure | Devolatilization under reduced pressure |
| pH after removal or deactivation of catalyst | 7.2 | 7.2 | 4.7 |
| Viscosity increase after deactivation (times) | 1.00 | 1.00 | 1.05 |
| Viscosity increase after storage (times) | 1.00 | 1.04 | 4.29 |
| Fe (µg/g) | <0.1 | <0.1 | 6.5 |
| Ni (µg/g) | <0.1 | <0.1 | 1.2 |

The invention claimed is:

1. A method for producing an organic polymer having a terminal trimethoxysilyl group,
   which comprises the steps of
   allowing an organic polymer having a silicon atom at a molecular terminus to react with methanol in the presence of a catalyst removable from an organic polymer and/or a deactivatable catalyst, wherein three hydrolyzable groups are bonded to the silicon atom, with the proviso that at least one of the three groups is a functional group other than methoxy group; and
   then deactivating the catalyst in the reaction mixture, or deactivating the catalyst in the reaction mixture and removing the catalyst from the reaction mixture, to give the organic polymer having a terminal trimethoxysilyl group, wherein the catalyst is deactivated using an epoxy compound.

2. The method according to claim 1,
   wherein water content in the reaction mixture is not more than 1,000 ppm.

3. The method according to claim 1,
   wherein the methanol contains not more than 5,000 ppm of water.

4. The method according to claim 1,
   which further comprises the steps of reducing water content in the raw materials and/or the reaction mixture before and/or during the reaction using a dehydrating agent.

5. The method according to claim 1,
   wherein the catalyst is a strong Brönsted acid.

6. The method according to claim 5,
   wherein the strong Brönsted acid is a hydrogen halide.

7. The method according to claim 4,
   wherein a halosilane is used as the dehydrating agent and/or a source of the hydrogen halide.

8. The method according to claim 6,
   wherein the hydrogen halide is hydrogen chloride.

9. The method according to claim 7
   wherein the halosilane is a monohalosilane that contains one hydrolyzable group.

10. The method according to claim 1,
    wherein the amount of the catalyst in the reaction mixture containing the organic polymer and methanol is not more than 0.05 part by weight to 100 parts by weight of the organic polymer.

11. The method according to claim 1,
    wherein the catalyst is diluted in an organic solvent.

12. The method according to claim 1,
    wherein the catalyst is removed by devolatilization under reduced pressure.

13. The method according to claim 1,
    which comprises deactivating the catalyst, and then removing methanol and/or the deactivated catalyst by devolatilization under reduced pressure.

14. The method according to claim 1,
    wherein the epoxy compound is one synthesized by oxidation reaction.

15. The method according to claim 1,
    the epoxy compound is used in an amount so that oxilane oxygen amount of the epoxy compound is not more than 100 mole equivalents to the used amount of the catalyst.

16. The method according to claim 1,
    wherein the amount of the catalyst remained in the organic polymer having a terminal trimethoxysilyl group after the catalyst deactivation or after the catalyst deactivation and the catalyst removal is not more than 0.001 part by weight to 100 parts of the organic polymer.

17. The method according to claim 1,
    which further comprises measuring pH value of an alcohol/water mixed solution of the organic polymer obtained after the catalyst deactivation or after the catalyst deactivation and the catalyst removal to control the pH value of the organic polymer.

18. The method according to claim 17,
    wherein pH value is 6 to 8.

19. The method according to claim 1,
    wherein the organic polymer having a terminal trimethoxysilyl group is produced in a reaction vessel whose inside surface is made of a corrosion-resistant material.

20. The method according to claim 19,
    wherein the corrosion-resistant material is a nickel-chromium-molybdenum alloy and/or glass lining and/or a fluororesin coating.

21. The method according to claim 1,
    wherein the amount of iron element in the organic polymer having a terminal trimethoxysilyl group is not more than 6 ppm.

22. The method according to claim 1,
    wherein the organic polymer having a silicon atom, to which three hydrolyzable groups are bonded, with the proviso that at least one of the three groups is a functional group other than methoxy group, at the molecular terminus is an organic polymer having a terminal triethoxysilyl group.

23. The method according to claim 22,
    wherein the organic polymer having a terminal triethoxysilyl group is a product of hydrosilylation reaction between triethoxysilane and an organic polymer having a terminal unsaturated group in the presence of a group VIII transition metal.

24. The method according to claim 23,
    wherein the organic polymer, in which not less than 85 % of total molecular termini of the organic polymer is an unsaturated group, is used.

25. The method according to claim 1,
    wherein the main chain of the organic polymer having a terminal trimethoxysilyl group essentially consists of polyether.

26. The method according to claim 1,
    wherein a step of producing the organic polymer having a silicon atom, to which three hydrolyzable groups are bonded, with the proviso that at least one of the three groups is a functional group other than methoxy group, at a molecular terminus and the step of allowing the organic polymer to react with methanol are both conducted in the same vessel.

* * * * *